United States Patent
Aull et al.

(10) Patent No.: US 7,650,406 B2
(45) Date of Patent: Jan. 19, 2010

(54) TERMINATION OF A SECURITY ASSOCIATION BETWEEN DEVICES

(75) Inventors: Randall E. Aull, Kenmore, WA (US); Firdosh K. Bhesania, Kirkland, WA (US); Glen T. Slick, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

(21) Appl. No.: 11/411,290

(22) Filed: Apr. 26, 2006

(65) Prior Publication Data

US 2007/0255827 A1    Nov. 1, 2007

(51) Int. Cl.
G06F 15/16 (2006.01)

(52) U.S. Cl. .............. 709/224; 709/223; 709/225; 709/226; 709/227; 709/228

(58) Field of Classification Search ......... 709/223–228
See application file for complete search history.

(56) References Cited

U.S. PATENT DOCUMENTS

| | | | | |
|---|---|---|---|---|
| 5,611,055 A * | 3/1997 | Krishan et al. | ............... | 710/301 |
| 6,240,077 B1 * | 5/2001 | Vuong et al. | ............... | 370/330 |
| 6,282,424 B1 * | 8/2001 | Wright et al. | ............... | 455/450 |
| 6,510,461 B1 * | 1/2003 | Nielsen | ............... | 709/224 |
| 6,816,910 B1 * | 11/2004 | Ricciulli | ............... | 709/237 |
| 6,826,612 B1 * | 11/2004 | Bosloy et al. | ............... | 709/227 |
| 6,957,263 B2 * | 10/2005 | Galou et al. | ............... | 709/227 |
| 7,185,075 B1 * | 2/2007 | Mishra et al. | ............... | 709/223 |
| 7,246,167 B2 * | 7/2007 | Kalmuk et al. | ............... | 709/227 |
| 7,376,741 B1 * | 5/2008 | Carter et al. | ............... | 709/228 |
| 7,409,452 B2 * | 8/2008 | Ragnet et al. | ............... | 709/227 |
| 2002/0042828 A1 * | 4/2002 | Peiffer | ............... | 709/227 |
| 2002/0071436 A1 * | 6/2002 | Border et al. | ............... | 370/395.32 |
| 2002/0147816 A1 * | 10/2002 | Hlasny | ............... | 709/227 |
| 2004/0015721 A1 * | 1/2004 | Eastlake, III | ............... | 713/201 |
| 2004/0093415 A1 * | 5/2004 | Thomas | ............... | 709/227 |
| 2004/0098474 A1 * | 5/2004 | Galou et al. | ............... | 709/223 |
| 2005/0021881 A1 * | 1/2005 | Asano et al. | ............... | 710/19 |
| 2005/0188231 A1 * | 8/2005 | Lai | ............... | 713/300 |
| 2005/0193137 A1 * | 9/2005 | Farnham | ............... | 709/230 |
| 2005/0242167 A1 * | 11/2005 | Kaario et al. | ............... | 235/375 |
| 2005/0267965 A1 * | 12/2005 | Heller | ............... | 709/224 |
| 2006/0129679 A1 * | 6/2006 | Hlasny | ............... | 709/227 |
| 2006/0168243 A1 * | 7/2006 | Zou | ............... | 709/227 |
| 2006/0264207 A1 * | 11/2006 | Tamura et al. | ............... | 455/415 |
| 2006/0291455 A1 * | 12/2006 | Katz et al. | ............... | 370/355 |
| 2007/0049293 A1 * | 3/2007 | Russell | ............... | 455/456.1 |
| 2007/0061434 A1 * | 3/2007 | Schmieder et al. | ............... | 709/223 |
| 2007/0130305 A1 * | 6/2007 | Piper et al. | ............... | 709/223 |
| 2009/0024744 A1 * | 1/2009 | Zou | ............... | 709/227 |

* cited by examiner

*Primary Examiner*—Alina N. Boutah
(74) *Attorney, Agent, or Firm*—Wolf, Greenfield & Sacks, P.C.

(57) ABSTRACT

A secure association may be established between a first device and a second device for providing secure communication. When the secure association is to be terminated, a first device may save an indication that termination of the secure association is pending, if it is unable to communicate with the second device at that time. At a later time, the first device may communicate with the second device to notify it that the secure association is to be terminated. After the second device has been notified, the secure association may be terminated by the first device.

18 Claims, 5 Drawing Sheets

TERMINATION OF A SECURITY ASSOCIATION BETWEEN DEVICES

BACKGROUND

Wireless communication standards such as IEEE standard 802.11, Bluetooth and Ultrawideband (UWB) enable devices to exchange information wirelessly. When two devices communicate wirelessly or via a wired connection, they may establish a secure association to provide secure communication. The secure association includes security keys, such as authentication keys for authenticating the devices to one another and encryption keys for encrypting/decrypting communications.

As one example, a person may wish to use a wireless Bluetooth keyboard with a computer. A secure association may be established for secure communications between the two devices. Once the secure association is established, the secure association is stored on both the Bluetooth keyboard and the computer (or the radio on the computer). Information in the secure association, such as the security keys, is accessed when the two devices communicate securely.

Authentication provides security for a connection by verifying a user or device's identity prior to establishing a connection. An authentication session may be initiated when one of the devices attempts to connect to another device. For example, the Bluetooth keyboard may initiate a connection with a computer, and the two devices may initiate an authentication session. During the authentication session, the devices use the authentication keys established for their secure association to verify the identity of the other user or device. Once the authentication session is completed, the two devices may engage in further communications. For example, the Bluetooth keyboard may send information about the user's keystrokes to the computer.

Encryption techniques may provide security by encrypting information that is exchanged by the two devices, making it difficult for an eavesdropper to determine the content of the transmitted message. The device that is sending information may encrypt information using an encryption key established for the secure association. The intended recipient may decrypt the information using an appropriate key established for the secure association.

SUMMARY

Some embodiments of the invention relate to terminating a secure association between devices, e.g., devices A and B. If the devices are able to communicate at the time the secure association is desired to be terminated, then the device that desires to terminate the secure association, e.g., device A, can inform device B that the secure association is to be terminated. However, the Applicants have appreciated problems that may occur if one of the devices attempts to terminate the secure association while the devices are not within range of each other. If devices A and B are not within range at the time the secure association is terminated by device A, device B may not be informed about the termination of the secure association. For example, device B may not be informed about the termination of the secure association if device B is out of wireless range of device A. When devices A and B are again in communication range, device B may repeatedly attempt to re-establish communications with device A because device B is unaware that the secure association has been terminated. However, device A may not accept communications from device B because device A has already deleted the secure association with device B. Device B may keep trying to contact device A without knowing that the secure association has been terminated, and may not be able to communicate with device A to learn of the disassociation. Such a scenario may lead to unnecessary processing, power drain and bandwidth utilization. Furthermore, failing to delete an unusable secure association may waste space on device B, which may have relatively limited memory available for storing secure associations.

In accordance with the invention, rather than immediately deleting a secure association upon determining that the secure association is to be terminated, device A may check to see whether it can communicate with device B. If the two devices are unable to communicate, device A may not terminate the secure association until device B can be informed about the termination of the secure association. Device A may save an indication that termination of the secure association is pending. For example, device A may add the secure association to a database of secure associations that are pending disassociation. Once the two devices are able to re-establish communication and have authenticated each other, they may only exchange information related to the termination of the secure association, and the secure association may be terminated by device A.

One embodiment of the invention relates to a method for a first device to terminate a secure association. The method may be performed in a computing environment that includes a first device and a second device. The first device and the second device have established a secure association for communication between the first device and the second device. The method includes saving an indication that termination of the secure association is pending, if the first device is unable to communicate with the second device. The method also includes communicating with the second device to notify the second device that the secure association is to be terminated, after saving the indication that termination of the secure association is pending. The method further includes terminating the secure association, after communicating with the second device.

Another embodiment of the invention relates to at least one computer-readable medium having computer-executable instructions encoded thereon that, when executed, perform acts of a method for a first device to terminate a secure association. The method may be performed in a computing environment that includes the first device and a second device. The first device and the second device have established a secure association for communication between the first device and the second device. The method includes saving an indication that termination of the secure association is pending, if the first device is unable to communicate with the second device. The method also includes communicating with the second device to notify the second device that the secure association is to be terminated, after saving the indication that termination of the secure association is pending. The method further includes terminating the secure association, after communicating with the second device.

A further embodiment of the invention relates to system for a first device to terminate a secure association, in a computing environment that includes the first device and a second device. The first device and the second device have established a secure association for communication between the first device and the second device. The system includes means for saving, by the first device, an indication that termination of the secure association is pending, if the first device is unable to communicate with the second device. The system also includes means for terminating the secure association, after a determined period of time has elapsed during which the first device and the second device are unable to communicate. The system further includes means for removing the indication that termination of the secure association is pending, after a determined period of time has elapsed during which the first device and the second device are unable to communicate.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
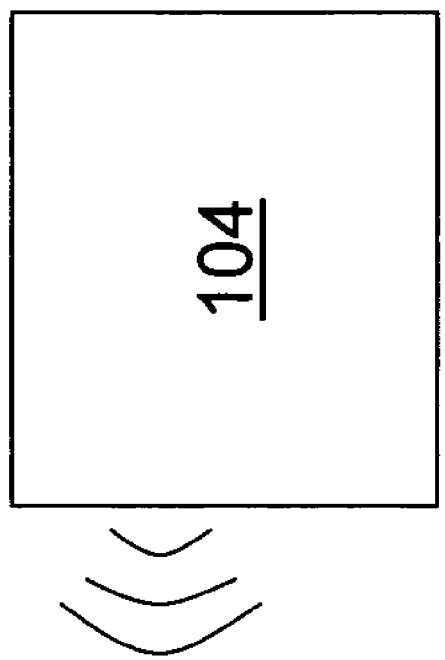
FIG. 1 is a diagram illustrating an example of a network environment in which embodiments of the invention may be implemented.
Figure 1:
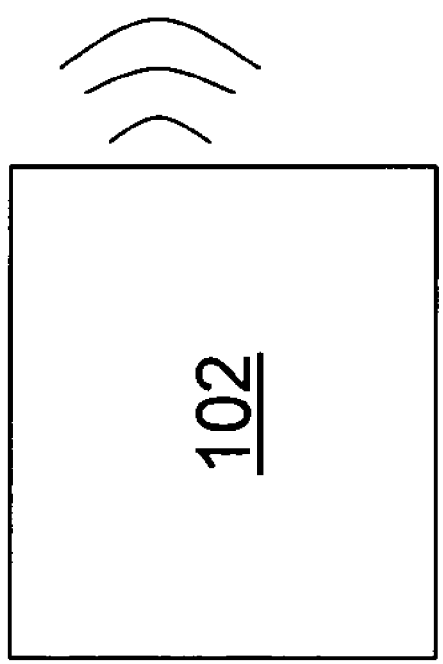

As discussed above, the Applicants have appreciated problems that may occur when one device terminates a secure association with another device. In prior systems, when the secure association was to be terminated, the secure association was simply deleted from the first device. For example, a user may purchase a new keyboard to replace a Bluetooth keyboard, and may uninstall software related to the Bluetooth keyboard from the user's desktop computer. As a consequence, the secure association between the desktop computer and the Bluetooth keyboard may be deleted from the computer. If the desktop computer and the Bluetooth keyboard are not able to communicate when the software is uninstalled, e.g., because the Bluetooth keyboard has been moved out of wireless range, the Bluetooth keyboard may not know that the secure association has been terminated. As a consequence, the Bluetooth keyboard may continually try to contact the desktop computer once it comes back in wireless range, but will not be able to do so because the computer has deleted the secure association and will not be able to authenticate the Bluetooth keyboard. The Bluetooth keyboard may not be able to determine that the secure association has been terminated. As a consequence, the Bluetooth keyboard may continually attempt to re-establish communications with the computer, which may cause unnecessary processing latency, power consumption and wastage of utilizable bandwidth.

Such a scenario may occur in a variety of circumstances. For example, a battery on one of the devices may run out of power, and during this time the other device may terminate the secure association. As another example, the two devices may be out of range when the secure association is terminated. As yet another example, the devices may not be able to communicate because one of the devices had a new Bluetooth radio installed, or the operating system was upgraded/reinstalled.

Furthermore, device B should not interpret a failure to authenticate to device A as an indication that the secure association has been terminated. Without authenticating device A, device B does not know that the device that failed the authentication was actually device A. Interpreting a failed authentication to be a disassociation of the secure association would expose device B to potential denial-of-service attacks.

As discussed above, embodiments of the invention relate to terminating a secure association. These embodiments enable notifying another device that a secure association is to be terminated prior to terminating the secure association. For example, a first device may determine that a secure association with a second device is to be terminated. The secure association may not be deleted immediately. If the first device is unable to communicate with the second device to notify the second device that the secure association is to be terminated, an indication may be saved that termination of the secure association is pending. For example, the first device may maintain a database of secure associations that are pending disassociation, and may add the secure association with the second device to the database. Once the first and second devices are able to re-establish communication and have authenticated each other, the first device may notify the second device that the secure association between the devices is to be terminated. Once the second device has been notified, the first device may terminate the secure association. For example, the first device may delete the secure association. Once the second device has been notified, the first device may remove the indication that termination of the secure association is pending, e.g., by removing the secure association from the database of secure associations pending disassociation.

As used herein, the term "association" means an established relationship between two devices. An association may be embodied as data, stored on one or both of the devices, that includes information about the relationship. A "secure association" is a relationship established between devices that is provided with at least some form of security, e.g., authentication and/or encryption. A secure association may be embodied as data, stored on one or both of the devices, that includes information about the security features of the association, e.g., authentication and/or encryption key(s). An active association is an established relationship between devices that may be used for exchanging information. Terminating an association, also called disassociation, means preventing the established relationship from being used, e.g., preventing the exchange of information. A secure association may be terminated, for example, by deleting the secure association from one of the devices, e.g., removing from memory the information about the secure association.

FIG. 1 is a diagram illustrating an example of a network environment in which embodiments of the invention may be implemented. FIG. 1 illustrates examples of device 102 and device 104, which communicate wirelessly using any suitable wireless communication standard, such as IEEE standard 802.11, Bluetooth or UWB. However, the invention is not limited to the type of communications used to communicate between devices 102 and 104. Any suitable communication may be used, such as wireless communications that use radio signals, infrared signals, or any other suitable type of communication. Although devices 102 and 104 have been illustrated in FIG. 1 as being capable of wireless communication, devices 102 and 104 need not necessarily communicate wirelessly, but could communicate through a wired connection, as the invention is not limited in this respect.

As one example, device 102 may be a Bluetooth keyboard and device 104 may be a desktop computer. Devices 102 and 104 may communicate according to the Bluetooth standard. However, devices 102 and 104 need not be a Bluetooth keyboard and desktop computer, but may be any devices capable of communicating with each other, such as computers, peripherals, personal digital assistants (PDAs), keyboards, printers, access points, cellular telephones, servers, or any other suitable type of device. In some circumstances, devices 102 and 104 may be the same type of device, such as two laptop computers engaged in ad hoc wireless communication.

Devices 102 and 104 may establish a secure association for wireless communications between the devices. Any suitable secure association may be established, such as a secure association that provides for authentication and/or encryption for communications between devices 102 and 104. The secure association may include security keys such as authentication and/or encryption keys, for example. The secure association may be stored on both device 102 and device 104, and may be stored in any suitable format. The format in which the secure association is stored need not necessarily be the same on both device 102 and device 104, as the invention is not limited in this respect. Furthermore, the invention is not limited as to the type of authentication and/or encryption techniques that are used, as any suitable techniques may be used.

Figure 2:
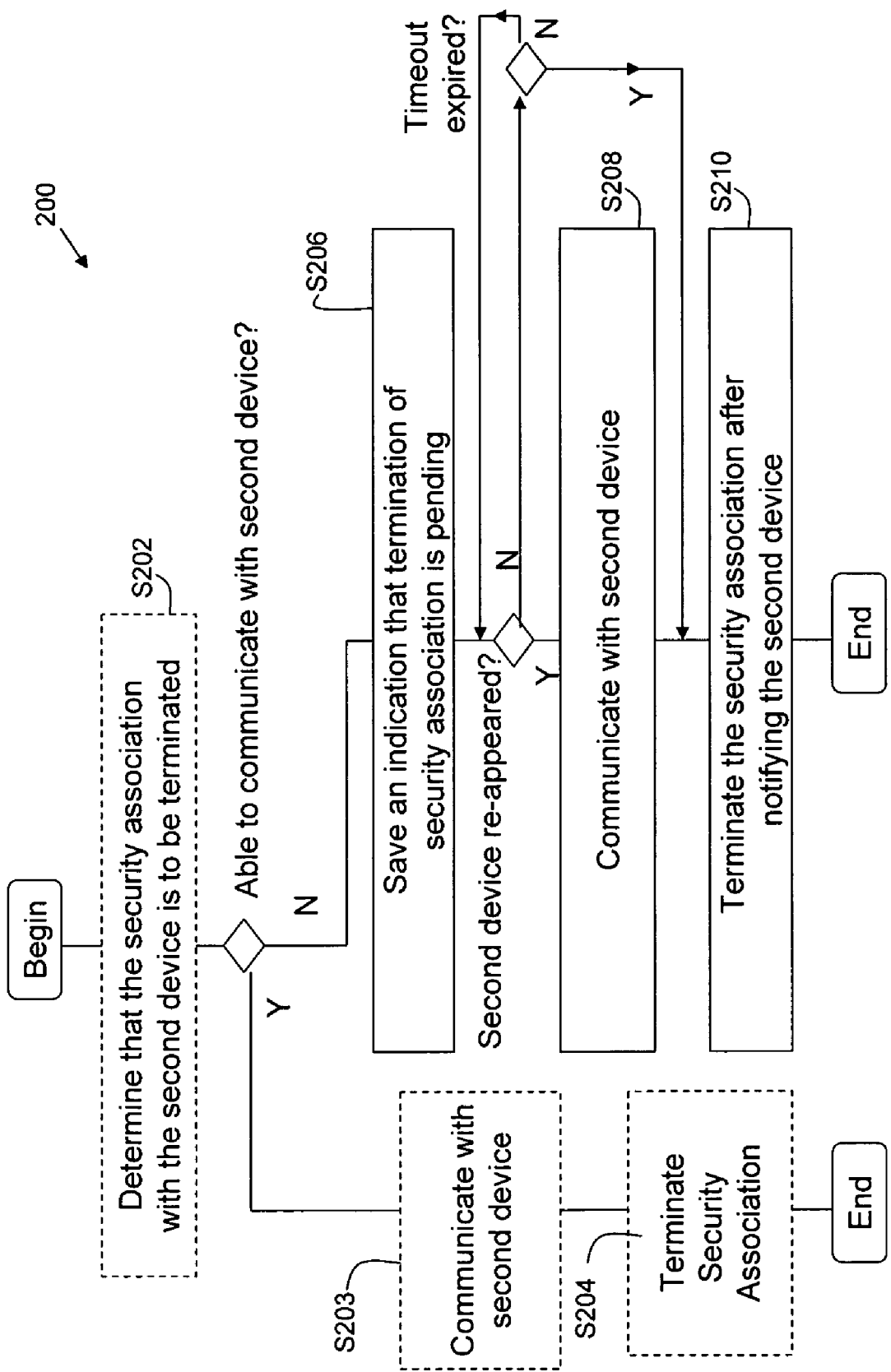
FIG. 2 is a flowchart illustrating an example of a method of terminating a secure association, according to some embodiments of the invention.

FIG. 2 is a flowchart illustrating an example of a method of terminating a secure association, according to some embodiments of the invention. For example, a user of device 104 may uninstall software on device 104 that is associated with device 102, e.g., a software driver for device 102. In step S202, a first device, e.g., device 104, may determine that the secure association is to be terminated, e.g., in response to receiving an indication that the user wishes to uninstall software related to device 102. However, such a determination may be made in any suitable way, as the invention is not limited in this respect. Once device 104 determines that the secure association with device 102 is to be terminated, it may determine whether it is able to communicate with device 102.

If device 104 is able to communicate with device 102, device 104 may communicate with device 102 in step S203 to notify device 102 that the secure association between the devices is to be terminated. In this case, device 104 may terminate the secure association in step S204. For example, once device 104 has notified device 102 that the secure association is to be terminated, device 104 may delete the secure association in step S204. Device 102 may also delete the secure association once device 102 has been notified that the secure association is to be terminated.

If device 104 is not able to communicate with device 102, the method may proceed to step S206. In step S206, device 104 may save an indication that the termination of the secure association is pending. For example, device 104 may maintain a database of secure associations which are pending disassociation. In some embodiments, device 104 may transfer the secure association from a database of active secure associations to the pending disassociation database. These embodiments will be discussed in greater detail below with respect to FIGS. 3A and 3B. In some embodiments, rather than maintaining a separate database of secure associations pending disassociation, the secure association may not be removed from the active list of secure associations, but may be marked to indicate that the secure association is pending disassociation. The secure association may be marked in any suitable way, such as by changing the value of a field or variable to indicate that the secure association is pending disassociation. These embodiments will be discussed in greater detail below with respect to FIG. 4. Any suitable indication may be saved to indicate that the termination of the secure association is pending, as the invention is not limited in this respect.

After device 104 has saved the indication that termination of the secure association is pending, device 104 may again attempt to communicate with device 102 at a later time. If device 104 is able to reestablish communications with device 102, device 104 may communicate with device 102 in step S208. In step S208, device 104 may notify device 102 that the association is to be terminated. In some embodiments, device 104 may only allow certain types of communication with device 102 during step S208. Since device 104 has determined that the secure association should be terminated, e.g., in response to action by a user, device 104 may not allow device 102 to communicate messages that are unrelated to disassociating device 102 from device 104. Limiting the type of communications allowed in step S208 may provide security by preventing unwanted communications. For example, communications between device 104 and 102 in step S208 may be limited to authentication, encryption and messages related to terminating the secure association.

If devices 102 and 104 are unable to communicate, device 104 may again attempt to communicate with device 102 at a later time. Device 104 may make attempts to contact device 102 until communication can be re-established. However, at a certain point, device 104 may stop attempting to contact device 102. In some embodiments, device 104 may stop attempting to contact device 102 after a determined time period.

If device 104 is able to notify device 102 that the secure association is to be terminated, device 104 may terminate the secure association in step S210. For example, step S210 may include deleting the secure association from device 104. For example, the secure association may be deleted from a pending disassociation list, as discussed above. As another example, information about the secure association, e.g., a security key, may be deleted. However, information need not necessarily be deleted in step S210, as the invention is not limited in this respect and the secure association could be terminated in any suitable way.

Although FIG. 1 illustrates a network environment in which two devices communicate wirelessly, the invention is not limited to a wireless environment. Embodiments of the invention, such as method 200, may be practiced by devices that communicate over a wired connection. As one example, a computer may establish a secure association with a server over the Internet. The secure association may be established for paying bills, transferring music or other media, IP telephony, or any other suitable purpose. At some point, the server may wish to terminate the secure association. For example, the user of the computer may have failed to pay a bill for the services in a timely manner. As another example, the user's subscription to a service may have expired. If the computer is not in communication with the server at the time the server terminates the connection, the computer may not learn of the disassociation and may continually try to reconnect to the server. Such a scenario may occur if Internet service is interrupted, the wired connection comes unplugged, or for any other suitable reason. If the computer keeps trying to contact the server, the server may repeatedly deny the connection, wasting bandwidth and processing power. In accordance with the invention, rather than immediately terminating the secure association, the server may first check to see if it is able to communicate with the computer. If not, the server may save an indication that termination of the secure association is pending. Once the server and the computer are again able to communicate, e.g., because Internet service has resumed, the server can notify the computer of the disassociation and terminate the secure association.

Figure 3B:
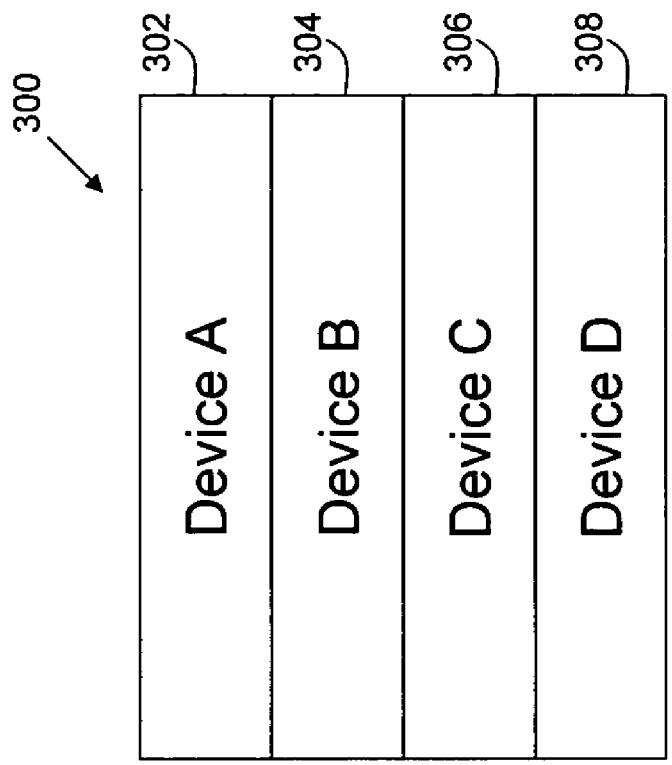
FIG. 3B is a diagram illustrating an example of a secure association pending disassociation database including four elements, according to some embodiments of the invention.
Figure 3A:
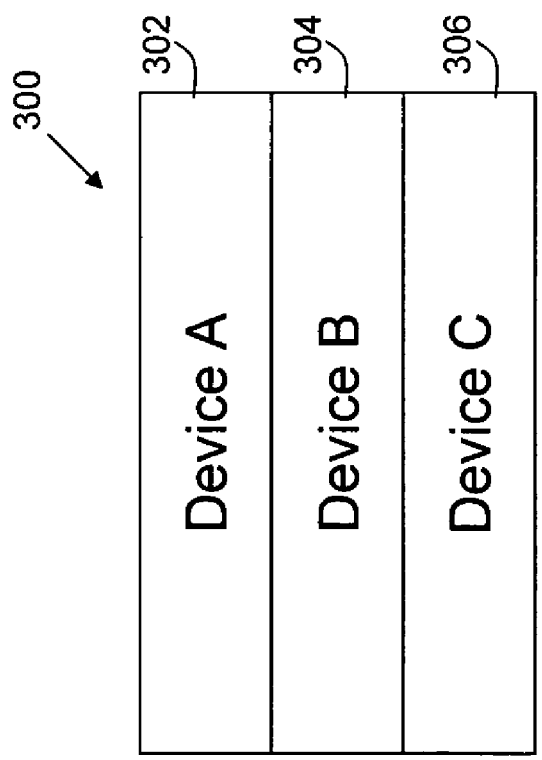
FIG. 3A is a block diagram illustrating an example of a secure association pending disassociation database including three elements, according to some embodiments of the invention.

FIG. 3A is a block diagram illustrating an example of a secure association pending disassociation database 300 including three elements 302, 304 and 306, according to some embodiments of the invention. Database 300 may be maintained by device 104, for example. Elements 302, 304 and 306 may be secure associations established for communication with devices A, B and C, respectively. Once device 104 determines that a secure association is to be terminated, the secure association may be added to database 300. For example, once device 104 determines that the secure association with device D is to be terminated, element 308 may be added to database 300. FIG. 3B is a block diagram illustrating an example of a secure association pending disassociation database 300 including four elements 302, 304, 306 and 308. In some embodiments of the invention, the secure association that is pending disassociation may be removed from a list of active secure associations and added to database 300.

When device 104 communicates with device 102, device 104 may check to see if the secure association for device 102 is active. Device 104 may determine that the secure association for device 102 is active because the secure association is in a database of active secure associations. As another example, device 104 may determine that the secure association for device 102 is active because the secure association is not present in the pending disassociation database 300. If device 104 determines that the secure association is active, device 104 may communicate with device 102 in accordance with the secure association. However, if device 104 determines that the secure association is not active, device 104 may check to see if the secure association is pending disassociation, e.g., by checking to see if the secure association is present in database 300.

Database 300 need not necessarily be a database of secure associations. For example, database 300 may be a list that represents the secure associations pending disassociation. In some embodiments, database 300 may be a list of users and/or devices for which the associated secure associations are pending disassociation.

Figure 4:
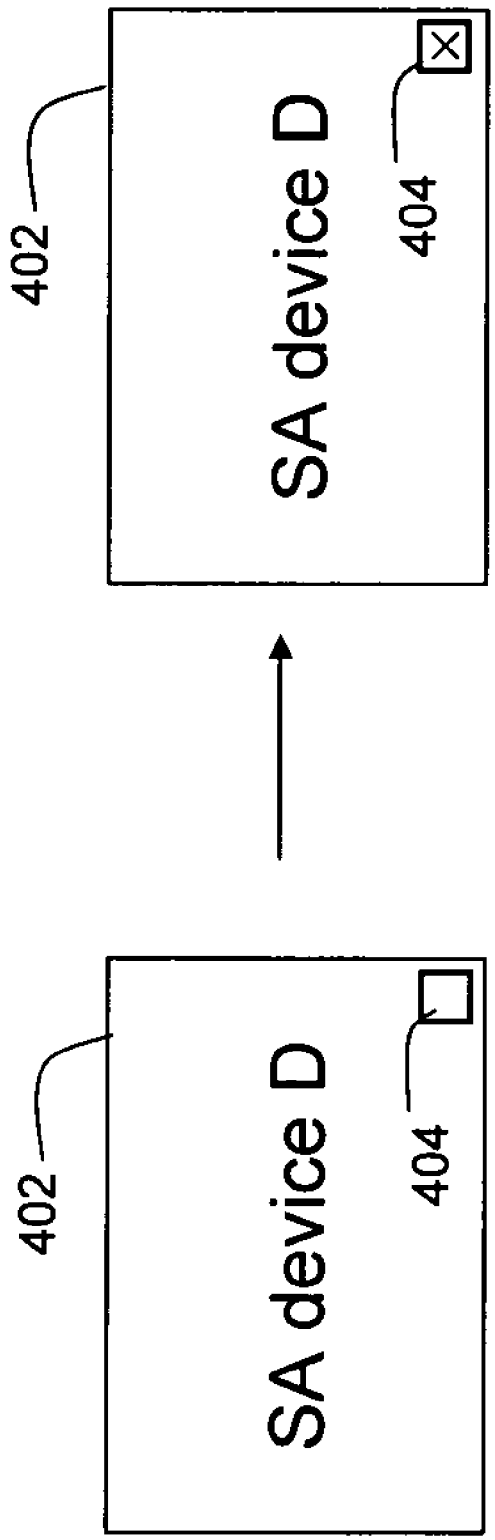
FIG. 4 is a diagram illustrating an example of marking a secure association as pending disassociation according to some embodiments of the invention.

In some embodiments of the invention, a pending disassociation database need not be used. For example, the indication that termination of the secure association is pending may be saved by marking the secure association in any suitable way. FIG. 4 is a diagram illustrating an example of marking a secure association 402 as pending disassociation. In this example, device 104 may maintain a database of active secure associations for communications, such as secure association 402 for communication with device D. Once device 104 determines that the secure association with device D is to be terminated, the active database may be altered to indicate that the secure association for device D is pending disassociation. A variable, flag, field, or any other suitable feature of the secure association may be altered. FIG. 4 illustrates one implementation in which a flag 404 may be changed to indicate that the secure association for device D is no longer active, but is pending disassociation.

Examples have been described in which a secure association transitions from "active" status to "pending disassociation" status. However, in some circumstances, a secure association may transition from "pending disassociation" status to "active" status. For example, device 104 may determine that the secure association should not be terminated. Such a situation may occur if, for example, device 102 re-associates with device 104. For example, device 102 may connect with device 104 through a different channel than the channel for which the secure association was established. In one example, if device 104 is a computer and device 102 is a Bluetooth keyboard, the computer may terminate the secure association with the Bluetooth keyboard. In response, the secure association status may transition from "active" to "pending disassociation." However, if a user plugs the Bluetooth keyboard into the computer through a wired connection, the computer may determine that the user did not intend to terminate the secure association with the Bluetooth keyboard. In response, the secure association status may transition from "pending disassociation" to "active." As another example, device 104 may delete the secure association while the secure association is "pending disassociation" on device 102. However, device 102 may not know that device 104 has deleted the secure association. If device 104 re-associates with device 102, then the status of the secure association on device 102 may transition from "pending disassociation" to "active."

Particular implementation details of computer systems that may execute aspects of the invention will now be described. These implementation details are provided by way of example only, and the invention is not limited to any particular implementation.

Figure 5:
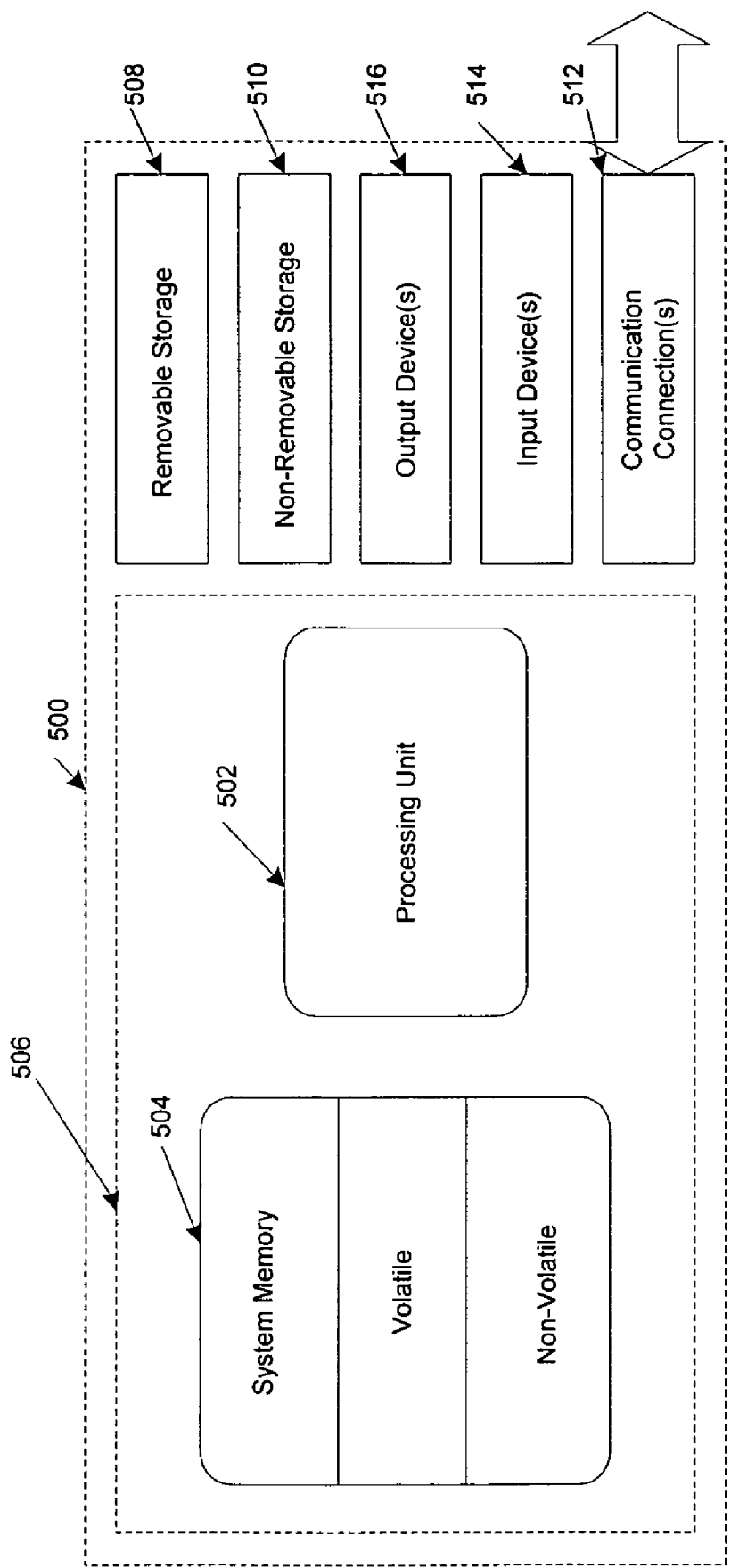
FIG. 5 is a block diagram showing an illustrative implementation of a computing system in accordance with some embodiments of the invention.

With reference to FIG. 5, an exemplary system for implementing embodiments of the invention includes a computing device, such as computing device 500, which may be a device suitable to function as device 102 or 104. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality.

Device 500 may include at least some form of computer readable media. Computer readable media can be any available media that can be accessed by device 500. By way of example, and not limitation, computer readable media may comprise computer storage media and communication media. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500. The databases described above, such as database 300, may be embodied on computer readable media stored on device 102, device 104, or any other suitable device. Any suitable database or other storage structure may be used, as the invention is not limited in this respect.

Device 500 may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may also have input device(s) 514 such as keyboard, mouse, pen, voice input device, touch input device, etc. Output device(s) 516 such as a display, speakers, printer, etc. may also be included. All these devices are well know in the art and need not be discussed at length here.

It should be appreciated that the invention is not limited to executing on any particular system or group of systems. For example, embodiments of the invention may run on one device or on a combination of devices. Also, it should be appreciated that the invention is not limited to any particular architecture, network, or communication protocol.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. In a computing environment comprising a first device and a second device, the first device and the second device having established a secure association for communication between the first device and the second device, a method for the first device to terminate the secure association, the method comprising:
   checking, by the first device, whether the first device can communicate with the second device;
   when the first device determines that the first device is unable to communicate with the second device, saving, by the first device, an indication that termination of the secure association is pending;
   when the first device is able to communicate with the second device, after saving the indication that termination of the secure association is pending, communicating with the second device to notify the second device that the secure association is to be terminated; and
   after communicating with the second device to notify the second device, terminating the secure association by the first device, wherein the communication comprises wireless communication, and wherein the first device is unable to communicate with the second device because the first device is not within wireless communication range of the second device.

2. The method of claim 1, wherein the saving of the indication that termination of the secure association is pending comprises maintaining a list of devices and/or secure associations that are pending disassociation.

3. The method of claim 1, wherein the saving of the indication that termination of the secure association is pending comprises altering the secure association and/or appending information to a database of secure associations.

4. The method of claim 1, wherein communication between the first device and the second device is limited to communication needed for authentication, encryption and disassociation, during the time period between saving the indication that termination of the secure association is pending and terminating the secure association.

5. The method of claim 1, wherein the second device comprises a peripheral.

6. The method of claim 1, wherein the secure association comprises an authentication and/or an encryption key.

7. The method of claim 1, further comprising:
   removing the indication that termination of the secure association is pending after communicating with the second device.

8. The method of claim 1, further comprising:
   removing the indication that termination of the secure association is pending in response to re-associating with the second device.

9. The method of claim 1, wherein the first device comprises a computer, the second device comprises a peripheral and the secure association is used for wireless communication between the computer and the peripheral, and further comprising
   removing the indication that termination of the secure association is pending after communicating with the peripheral.

10. The method of claim 1, wherein the checking comprises first checking by the first device, and the method further comprises:
    second checking, by the first device, whether the first device can communicate with the second device, after the first device saves the indication that termination of the secure association is pending and prior to communicating with the second device to notify the second device that the secure association is to be terminated.

11. At least one computer-readable storage medium having computer-executable instructions encoded thereon that, when executed, perform acts of a method for a first device to terminate a secure association, in a computing environment comprising the first device and a second device, the first device and the second device having established a secure association for commemoration between the first device and the second device, the method comprising:
    checking, by the first device, whether the first device can communicate with the second device;
    when the first device determines that the first device is unable to communicate with the second, device, saving, by the first device, an indication that termination of the secure association is pending;
    when the first device is able to communicate with the second device, after saving the indication that termination of the secure association is pending, communicating with the second device to notify the second device that the secure association is to be terminated; and after communicating with the second device to notify the second device, terminating the secure association by the first device, wherein the communication comprises wireless communication, and wherein the first device is unable to communicate with the second device because the first device is not within wireless communication range of the second device.

12. The at least one computer-readable storage medium of claim 11, wherein the saving of the indication that termination of the secure association is pending comprises maintaining a list of devices and/or secure associations that are pending disassociation.

13. The at least one computer-readable storage medium of claim 11, wherein the saving of the indication that termination of the secure association is pending comprises altering the secure association and/or appending information to a database of secure associations.

14. The at least one computer-readable storage medium of claim 11, wherein communication between the first device and the second device is limited to communication needed for authentication, encryption and disassociation, during the time period between saving the indication that termination of the secure association is pending and terminating the secure association.

15. The at least one computer-readable storage medium of claim 11, wherein the secure association comprises an authentication and/or an encryption key.

16. The at least one computer-readable storage medium of claim 11, further comprising:

removing the indication that termination of the secure association is pending after communicating with the second device to notify the second device that the secure association is to be terminated.

17. The at least one computer-readable storage medium of claim 11, further comprising:

removing the indication that termination of the secure association is pending in response to re-associating with the second device.

18. The at least one computer-readable storage medium of claim 11, wherein the first device comprises a computer, the second device comprises a peripheral and the secure association is used for wireless communication between the computer and the peripheral, and further comprising removing the indication that termination of the secure association is pending after communicating with the peripheral to notify the peripheral that the secure association is to be terminated.

* * * * *

UNITED STATES PATENT AND TRADEMARK OFFICE
CERTIFICATE OF CORRECTION

PATENT NO. : 7,650,406 B2  Page 1 of 1
APPLICATION NO. : 11/411290
DATED : January 19, 2010
INVENTOR(S) : Aull et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 718 days.

Signed and Sealed this

Twenty-third Day of November, 2010

David J. Kappos
*Director of the United States Patent and Trademark Office*